United States Patent [19]

Rafson

[11] Patent Number: 4,863,495
[45] Date of Patent: Sep. 5, 1989

[54] PROCESS FOR REMOVING VOLATILE ORGANIC COMPOUNDS FROM AIR STREAMS

[75] Inventor: Harold J. Rafson, Highland Park, Ill.

[73] Assignee: QUAD Environmental Technologies Corp., Northbrook, Ill.

[21] Appl. No.: 154,879

[22] Filed: Feb. 11, 1988

[51] Int. Cl.⁴ .............................................. B01D 47/00
[52] U.S. Cl. .................................... 55/85; 55/84; 55/90; 55/92; 55/257.4; 261/118
[58] Field of Search .................. 55/84, 85, 90, 89, 92, 55/93, 94, 257 R, 257.4; 261/118

[56] References Cited

U.S. PATENT DOCUMENTS

| | | | |
|---|---|---|---|
| 1,979,189 | 10/1934 | Bowers | 55/89 |
| 2,858,903 | 11/1958 | Goetz et al. | 55/89 |
| 3,406,498 | 10/1968 | Wisting | 55/257 C |
| 3,593,496 | 7/1971 | Merrill | 55/77 |
| 3,756,171 | 9/1973 | De Bord | 55/233 |
| 4,125,589 | 11/1978 | deVries | 423/245 |
| 4,238,461 | 12/1980 | deVries | 423/210 |
| 4,364,750 | 12/1982 | Koncz | 55/89 |
| 4,416,861 | 11/1983 | deVries | 55/94 |

FOREIGN PATENT DOCUMENTS

| | | | |
|---|---|---|---|
| 17183 | 2/1976 | Japan | 55/90 |
| 41677 | 4/1976 | Japan | 55/84 |
| 136770 | 11/1978 | Japan | 55/84 |
| WO86/02283 | 4/1986 | PCT Int'l Appl. | 55/68 |
| 1222553 | 2/1971 | United Kingdom | 55/84 |

Primary Examiner—Bernard Nozick
Attorney, Agent, or Firm—Roland H. Shubert

[57] ABSTRACT

Volatile organic compounds including hydrocarbons, halogenated compounds and other hazardous and toxic chemicals are removed from air streams by contacting the air with a suspension of tiny water droplets sized such that the droplets have an internal pressure significantly greater than atmospheric. The solubility of organic compounds in water droplets and their rate of transfer from an air stream to the droplets increases rapidly as the droplet internal pressure rises. After substantial transfer of volatile organic compounds from the air into the droplets is accomplished, the droplets are separated from the air stream and the resulting liquid effluent is disposed of in a manner which prevents escape of contained contaminant compounds.

14 Claims, 1 Drawing Sheet

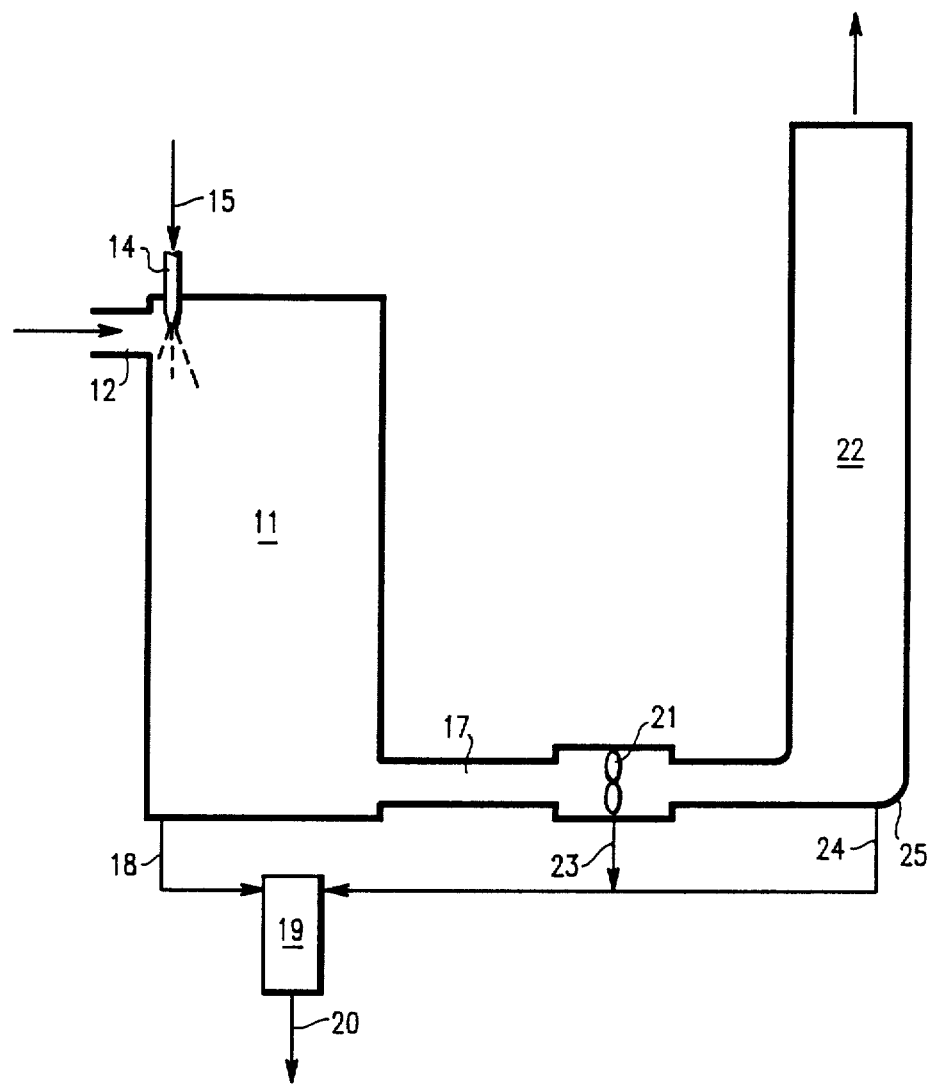

PROCESS FOR REMOVING VOLATILE ORGANIC COMPOUNDS FROM AIR STREAMS

BACKGROUND OF THE INVENTION

1. Field of the Invention

This invention relates generally to a process for removing contaminants from a gas stream.

More particularly, this invention relates to the removal of volatile organic compounds from air streams such as those produced in the treatment of wastes.

The build-up of volatile organic compounds in ambient air is of increasing concern as such compounds are now recognized as a major source of air pollution in many urban areas. Many volatile organic compounds are released into the air through the inevitable leaks and spills accompanying industrial processes and chemical manufacture and these sources of pollution have had much attention. It has recently become evident that the treatment of municipal liquid wastes also releases substantial quantities of volatile organic compounds into the atmosphere. Some of these compounds find their way into collection systems as oils and other wastes which are dumped into sewers and some by run-off from rain washing streets with residues from automotive traffic. No satisfactory means for control or capture of these pollutants is presently available.

Municipal waste water treatment facilities liberate volatile organic compounds in a number of different treatment operations. Such operations include, for example, pumping stations, trickling filters, aerobic digesters, aeration basins and the like. The variety and quantity of volatile organic compounds liberated into the atmosphere in such unit operations include many compounds that one would not ordinarily expect from sewage sources. Major classes of organic compounds identified in studies of process air streams in certain municipal waste water treatment plants include hydrocarbons of all common sorts; aromatics including benzene, alkyl benzenes, toluene, xylenes, naphthalene and the like; oxygenated compounds such as alcohols, ketones and epoxides; halogenated compounds including chloroform, trichloroethylene methylene chloride and freons; nitrogenous compounds such as pyridine and various nitriles; and sulfur containing compounds including dimethyl disulfide and hydrogen sulfide. The concentration of individual compounds typically ranges in exhaust gases from a few parts per billion to a few hundred parts per million. Because of these low contaminant concentrations and because of the very large volume of air involved, ordinary treatment methods such as direct or catalytic combustion, absorption, adsorption, and the like, are either not applicable or are prohibitively expensive. Conventional technologies using recirculating chemicals first concentrate and then re-evaporate contaminants which recontaminates the exhaust gases.

2. Description of the Prior Art

One treatment method proposed in the patent literature for the removal of organic pollutants from air is that set out in the Merrill patent, U.S. Pat. No. 3,593,496. Merrill discloses that organic pollutants such as hydrocarbons can be removed from air by mixing the air with an aerosol of water droplets containing a surfactant which presents an oleophilic surface on the water droplets. The aerosol droplets absorb organic pollutants into and on their oleophilic surfaces and removal of the droplets from the air stream leaves a substantially purified air stream. Merrill prefers to form his droplets from aqueous suspensions of lecithin compounds as the surfactant.

Another process, which has come to be known as mist scrubbing, has recently been developed for removing contaminants, particularly odorous contaminants, from gas streams. This process uses an aqueous solution of one or more chemicals which are reactive toward the odorous contaminants. Contact between the reagent solution and the gas is accomplished by atomizing the aqueous chemical solution into very tiny liquid droplets and dispersing the droplets into the gas stream. The liquid droplets are sized such that they do not immediately settle out but instead drift with the gas much in the manner of a natural fog. Typical installations utilize droplets having a number median diameter on the order of about ten microns. Mist scrubbing processes are illustrated by U.S. Pat. Nos. 4,125,589 and 4,238,461.

In typical mist scrubbing processes, a suspension of atomized reagent droplets in an air stream is passed in concurrent fashion through a reaction chamber or scrubber vessel. It is usual practice to introduce the reagent droplet suspension into the top of the scrubber vessel and to remove a cleaned gas stream from the bottom of the vessel. The reaction vessel contains no packing or internal media of any kind and is sized to provide the desired reaction time, typically ranging from about five to thirty seconds, between the gas and reagent droplets.

Drain means are ordinarily provided at the bottom of the vessel to remove that spray liquid which settles out in the contacting step and the collected liquid is discharged as a waste stream. Depending upon reaction conditions, particularly contact time and the size distribution of the spray droplets, the amount of spray liquid which settles out, and is removed from, the vessel is normally less than the amount of liquid introduced into the scrubber vessel in the droplet spray. The remainder of the spray liquid is carried from the reaction chamber with the exiting cleaned gas stream either as a vapor or as a suspension of tiny droplets or is volatilized to saturated the gas stream. A nearly complete and stoichiometric reaction between the reagent and the gas contaminants can routinely be achieved. Because the reagents ordinarily used in odor removal are reduced to low concentrations and comprise chemicals such as sodium hypochlorite, sodium hydroxide and sulfuric acid, the escape of exhausted reagent droplets in the cleaned air stream is of no significant concern.

A study totally unrelated to gas scrubbing technology and concerning the concentrations of pesticides found in morning mists above agricultural fields suggests that process mechanisms analogous to those employed by Merrill may also occur in the natural environment. Researchers D. E. Glotfelty et al, writing in *Nature*, Volume 325, Pages 602-605, Feb. 12, 1987, reported that certain natural fogs contained unexpectedly high concentrations of pesticides, herbicides and other chemicals. Fog sampled in Beltsville, Md. and in the San Joaquin Valley of California was found to contain concentrations of some toxic substances that was many times higher than was predicted by calculation using Henry's Law. Concentrations of insecticides such as malathion and herbicides such as alachlor in the fog droplets was far higher than was the level of these compounds in the surrounding air.

Their reported data showed that enrichment into the fog droplets was more pronounced for hydrophobic pesticides than for hydrophilic ones. The authors proposed two hypotheses to explain the enrichment. One hypothesis was that the fog droplets contained solutes such as dissolved or colloidal organic material which increased the solubility of hydrophobic compounds thereby shifting the equilibrium to the solution phase. A second hypothesis was based upon the authors' observation that surface-active, non-pesticidal organic matter was present in the fog liquid as shown by its foamy, soapy appearance. Although the authors cautioned that they had no experimental verification, they considered it to be a reasonable conjecture that surface-active material might have been present in sufficient amounts to produce an organic film on the surface of the fog droplets. Thus, the surface-active organic matter presumed to be present at the air-water interface acted to enhance the uptake of pesticides into the aqueous phase in a manner reminiscent of the process described by Merrill.

SUMMARY OF THE INVENTION

It has been found that the up-take and removal of volatile organic compounds from air streams by aqueous droplets is a function of internal droplet pressure. The higher the internal droplet pressure, the greater is the capacity of the droplet to solubilize and contain most organic compounds. Internal droplet pressure is a function of droplet size and the smaller the droplet, the higher is the internal pressure. In practice of the invention, a contaminated air stream is contacted with a suspension of aqueous droplets for a period of time sufficient to allow substantial transfer of organic molecules from the air into the droplets. Water droplets are then separated from the air and the collected liquid is disposed of in a manner which prevents escape of organic compounds contained therein.

Hence, it is an object of this invention to remove volatile organic compounds from air.

It is a specific object of this invention to treat process air streams to remove organic compounds therefrom.

One specific object of this invention is to treat air streams derived from the processing of municipal waste waters to remove both odorous contaminants and volatile organic compounds therefrom.

DESCRIPTION OF THE DRAWING

The sole FIGURE shows a schematic diagram of a system according to the present invention.

DETAILED DESCRIPTION OF THE INVENTION

This invention arises from observations that the solubility of organic compounds commonly found in process air streams increases rapidly in aqueous droplets as the internal droplet pressure increases. Application of those observations in the manner hereinafter set forth results in a practical air-cleaning process. Following is an explanation of the mechanism of organic compound concentration in aqueous droplets and a description of equipment useful in carrying out the process.

Volatile organic compounds, which are often hazardous and toxic chemicals, are present in gaseous emissions (usually from industrial processes) in parts per billion or parts per million concentration levels. Contaminated air streams are also produced by air stripping liquids, such as contaminated ground water, which contain hazardous compounds. The process of this invention will remove those gaseous contaminants from such emissions and collect them in a relatively concentrated form so that safe disposal practices can be accomplished effectively and economically.

The method by which contaminant concentration is achieved is by creating at atmospheric pressure, localized superatmospheric pressure conditions in which the volatile organic compounds are additionally soluble and additionally reactable. That apparent incongruity is achieved by forming extremely small droplets in which the surface tension of the liquid, which may be water or a dilute chemical solution, creates a higher pressure within the droplet than exists in the surrounding atmosphere. Each droplet may be visualized as a clenched fist; the smaller and more tightly clenched it is the greater the pressure inside. The internal pressure of a droplet of any particular diameter may be calculated from surface tension data. With water, a droplet of 10 microns diameter has a calculated internal pressure of about 4 psi. Each droplet, then, acts as a small pressure vessel in which volatile organic compounds have increased solubility. Further, higher pressures tend to increase the reactivity of compounds dissolved in the droplet. Any reaction which takes place between compounds present in the droplet tends to decrease the vapor pressure of those compounds and so decrease their tendency to escape from the droplet.

It can now be appreciated that the differential pressure between the interior of a small droplet and the atmosphere acts as a first disproportion to effect a preferential concentration of organic compounds within the droplet. A second aspect of the preferential concentration of contaminants achieved by this invention arises from a second disproportion between the inside and the outside of each droplet. This second disproportion is the mechanism and the difference in the ease of passage of a contaminant compound into or out from the droplet. These differences can be visualized as follows. The entering molecule need only be dissolved in the surface film of the droplet at atmospheric pressure. An exiting molecule has a greater hurdle to overcome in that it is more soluble on the inside of the droplet surface film than on the outside. Therefore, these natural forces will maintain it at higher concentrations on the inside. Moreover, the partial pressure exerted by the compound inside the droplet is decreased because of the higher droplet pressure thus further reducing the tendency of the compound to escape. It is also possible that surface tension forces of the liquid further act to hold the molecules of the contaminant compounds within the droplets.

All of these effects, taken in combination, serve to produce a remarkable level of removal of diverse organic compounds from air streams and their concentration in aqueous droplets. The degree of such removal can be appreciated from an examination of the following data. Tests were performed using a mist scrubber generating droplets of approximately 10 microns in diameter and an internal pressure of about 4 psi. The scrubber was being applied to treat fecal odors in an air stream. Compounds responsible for such odors are generally readily soluble in water and quite reactive toward oxidizing agents such as sodium hypochlorite. Gas chromatographic techniques were used to identify and determine the concentration of gaseous contaminants in both the inlet to and the exhaust from the scrubber. Analyses of gases entering the scrubber showed that the gas stream contained a large variety of chemically non-reactive, volatile organic compounds in significant quantity. Surprisingly, there was a significant decrease in the concentration of many of those volatile organic compounds in samples of air taken from the scrubber exhaust. Exemplary results obtained are set out in the following Table.

TABLE 1

| Compound | Concentration, parts per billion | |
|---|---|---|
| | Inlet | Outlet |
| Pyridine | 36 | 7 |
| Terpene | 603 | 0 |
| Limonene | 779 | 31 |
| Xylene | 24 | 8 |
| Decahydronaphthalene | 201 | 57 |
| Trimethylbenzene | 72 | 19 |
| Tetrachloroethylene | 14 | 7 |
| Dichlorobenzene | 66 | 22 |
| Carbon disulfide | 18 | 13 |
| Dimethyl sulfide | 225 | 3 |
| Acetone | 2469 | 770 |
| Methylethylketone | 3753 | 588 |
| Hexanone | 62 | 19 |
| Ethanol | 13 | 0 |
| Methylpropylbenzene | 13 | 9 |
| Styrene | 76 | 0 |
| Butylbenzene | 39 | 20 |
| Isobutyltoluene | 24 | 11 |
| Alkylbenzene, mol. wt 134 | 72 | 34 |
| Naphthalene | 32 | 9 |
| Methylnaphthalene | 45 | 20 |
| Pentane | 28 | 6 |
| Isoprene | 179 | 0 |
| Tetramethylhexane | 96 | 49 |
| Decane | 2668 | 182 |

As can be appreciated from a review of these data, a wide variety of chemical compounds were substantially reduced in concentration by passage through the scrubber.

Having now concentrated contaminant gases in the small aqueous droplets, it is next necessary to remove these droplets from the gas stream. This may be accomplished by a variety of mechanisms. Probably first in importance is the setting of an appropriate contact time between the gas and the liquid droplets. There must be provided an adequate time for contact between gas and droplets for accomplishing the gas cleaning; the transfer of contaminant molecules from the gas to the liquid droplets. Thereafter, additional contact time encourages the collision between droplets which merge, become larger, and fall from the gas stream. Additional turbulence, after gas cleaning is complete, also encourages droplet collisions and enlargement. Provision of abrupt turns in gas direction or the interjection of targets for collision such as with a mist eliminator aids droplet removal. Centrifugation, which can occur as air passes through a fan, tends to throw liquid droplets to outer walls. Collision with larger droplets that may be introduced as a spray also serves to strip the smaller droplets from the air stream but this technique has the disadvantage of increasing liquid effluent and decreasing contaminant concentration in the effluent. Finally, design of the exhaust stack to have a low gas velocity will ensure that droplets which may have been increased in size through prior collisions will not be transported out of the stack.

The process of this invention can be more readily appreciated by reference to the FIGURE which depicts in generally schematic form one preferred embodiment of the invention. Referring now to the FIGURE, an air stream containing small quantities of volatile organic compounds is passed to reaction chamber 11 by way of conduit means 12. Water or dilute chemical solution is supplied to a nozzle or other atomizing means 14, located in close proximity to the entry point of the incoming air stream, by way of conduit 15 where it is atomized into tiny droplets. The volume of reaction chamber 11 is sized relative to the flow rate of the air stream entering the chamber through conduit 12 so as to provide a contact time between liquid droplets produced by the nozzle 14 and the air being treated of at least a few seconds, preferably in excess of five seconds, and to provide, in addition, time for collision between droplets. The combined residence time of air within the reaction chamber will generally be in excess of 20 seconds. The droplets produced by nozzle 14 must be sized such that a substantial portion of the droplet population has an internal pressure significantly above atmospheric. In terms of droplet diameter, this requires that the droplets be mostly less than 20 microns in diameter and preferably less than 10 microns in diameter.

The treated air stream, depleted in many of the volatile organic compounds carried therein, exits chamber 11 by way of duct 17 which is positioned at the chamber end opposite the gas entry. Drain means 18 are provided at the bottom of the chamber to remove settled out spray liquid from the chamber.

The settled out spray liquid removed from the reaction chamber by way of line 18 is enriched in those compounds stripped from the air stream. That liquid may be disposed of in any appropriate fashion, without release of the contained contaminant compounds, or it may be further treated as by activated carbon or other adsorbent in column 19 to strip the organics and leave a relatively pure water stream 20. The basic point is that the contaminant organic compounds originally contained in a large volume of air have been concentrated in a quite small volume of liquid making conventional disposal or removal techniques far more practical.

The gas in duct 17 passes through an exhaust fan 21 which propels the gas and also causes collisions between droplets and centrifuges droplets from the gas stream. These liquids are removed through drain 23 and combined with drain 18 for disposal.

The exiting gas then passes through ducting to an exhaust gas stack 22 which desirably has a larger diameter than ordinarily would be provided with resultant lower gas velocity so that droplets will not be transported up the stack. Those droplets which collide at the elbow 25 or the stack 22, or fall out within the stack, are collected by drain 24 and merged with drains 18 and 23 for disposal.

It is important to the proper functioning and optimization of the process that attention be directed to a number of different factors. First, the mixture of volatile organic compounds present in air streams amenable to treatment by this process typically includes relatively reactive compounds along with essentially non-reactive compounds such as hydrocarbons and halogenated compounds. For this reason it is ordinarily advantageous to add an appropriate chemical to the water supplied to nozzle 14 for reaction with gaseous contaminants. Oxidizing agents such as sodium hypochlorite and mineral acids and bases have been found especially useful.

Close attention must be paid to the concentration of chemicals added to the water supplied to the atomizing nozzle. Chemical addition beyond stoichiometric requirements is not desirable and this requirement demands good sensing and control mechanisms for chemical feed.

The size and size distribution of the atomized droplets has a direct effect upon the operating efficiency of the process. Any type of atomization system can be used which creates a peaked distribution with a number majority of the droplets having an internal pressure above about 3 to 4 psi. That pressure corresponds to a size distribution wherein the majority of the count of droplets have a diameter below about 10 microns. Because it is the small, high internal pressure droplets which are effective to remove contaminants, it is advantageous to use atomizing means which produce a high proportion of tiny droplets with as small a population of larger, fast-falling droplets as possible.

Volume of liquid atomized must be proportioned to contaminant concentration and gas flow rate. It is first necessary to ensure that adequate liquid is atomized to saturate the gas stream if it is at less than 100% relative humidity. After saturation of the gas stream, adequate numbers of high internal pressure droplets must remain to react with and absorb or dissolve the contaminant compounds. Lastly, it is important to avoid a large excess of liquid as that increases the amount of liquid effluent requiring disposal and complicates effective removal of residual droplets. For most applications, the amount of liquid effluent will appropriately range from about 0.05 to about 0.5 gallons per 1000 cubic feet of air.

Reaction chamber design also affects process efficiency. The design of the reaction chamber must provide for adequate, undisturbed contact time between the droplets and the gas to achieve effective gaseous contaminant removal. It must also provide for additional contact time for droplet collision, growth and settling.

Finally, the design of the gas exhaust system, including impingement means, fan, ducting and exhaust stack should be such as to maximize droplet collection and removal.

While specific embodiments of the invention have been described, other variations will be obvious to those skilled in the art and such variations are within the scope of the disclosed and claimed invention.

I claim:

1. A method for removing volatile organic compounds from air streams which comprises:
   forming atomized aqueous spray droplets, said droplets characterized by having an internal pressure significantly greater than atmospheric;
   contacting an air stream containing volatile organic compounds with said spray droplets for a time sufficient to achieve substantial transfer of said volatile organic compounds from the air into the droplets;
   continuing the contact between the air and droplets for an additional time sufficient to allow collisions between droplets with droplet growth and settling;
   removing droplets from the air stream to collect a liquid effluent enriched in volatile organic compounds and to obtain a cleaned air stream; and
   disposing of said collected liquid effluent by contacting it with an adsorbent to strip organic compounds therefrom thereby preventing escape of contaminant organic compounds contained therein.

2. The method of claim 1 wherein said adsorbent is activated carbon.

3. The method of claim 1 in which the number majority of said droplets have an internal pressure of about 4 psi or greater.

4. The method of claim 3 wherein the volume of liquid atomized is proportioned to the flow rate of the air stream so as to obtain a liquid effluent ranging from about 0.05 to about 0.5 gallons per 1000 cubic feet of air.

5. The method of claim 3 wherein said time provided for transfer of volatile organic compounds from the air to the droplets is at least about 5 seconds.

6. The method of claim 5 wherein the total contact time between the air and droplets is about 20 seconds.

7. The method of claim 3 wherein said volatile organic compounds include compounds reactive with an oxidizing agent, an acid or a base in dilute aqueous solution.

8. The method of claim 7 wherein said atomized aqueous spray droplets contain a chemical selected from the group consisting of oxidizing agents, mineral acids and bases in a concentration just sufficient to provide the stoichiometric requirements for complete reaction with said reactive compounds.

9. The method of claim 8 wherein said chemical is selected from the group consisting of sodium hypochlorite, sodium hydroxide, and mixtures thereof.

10. The method of claim 8 wherein said chemical is a mineral acid.

11. The method of claim 3 wherein turbulence causing droplet collision and growth is induced into the mixture of said spray droplets and air after substantial transfer of said volatile organic compounds from the air into the droplets has been achieved.

12. The method of claim 11 wherein said droplet collision is enhanced by providing abrupt in gas direction.

13. The method of claim 11 wherein said droplet collision is enhanced by providing targets for droplet collision.

14. The method of claim 11 wherein said droplet collision is enhanced by passing said droplet and air mixture through a fan.

* * * * *